United States Patent [19]

Takahashi et al.

[11] Patent Number: 5,238,882
[45] Date of Patent: Aug. 24, 1993

[54] METHOD OF MANUFACTURING SILICON NITRIDE SINTERED BODIES

[75] Inventors: Tomonori Takahashi, Chita; Manabu Isomura; Keiji Matsuhiro, both of Nagoya, all of Japan

[73] Assignee: NGK Insulators, Ltd., Aichi, Japan

[21] Appl. No.: 894,640

[22] Filed: Jun. 5, 1992

Related U.S. Application Data

[63] Continuation of Ser. No. 521,567, May 10, 1990, Pat. No. 5,177,038.

[30] Foreign Application Priority Data

May 10, 1989 [JP] Japan .................. 1-114965
Apr. 27, 1990 [JP] Japan .................. 2-110633

[51] Int. Cl.$^5$ .............................. C04B 35/52
[52] U.S. Cl. ............................ 501/92; 264/65
[58] Field of Search .............. 264/65; 501/92, 98

[56] References Cited

U.S. PATENT DOCUMENTS

| | | | |
|---|---|---|---|
| 3,833,389 | 9/1974 | Komeya et al. | 501/92 |
| 3,969,125 | 7/1976 | Komeya et al. | 264/63 |
| 4,097,293 | 6/1978 | Komeya et al. | 501/87 |
| 4,184,882 | 1/1980 | Lange | 501/92 |
| 4,280,850 | 7/1981 | Smith et al. | 106/73.2 |
| 4,407,971 | 10/1983 | Komatsu et al. | 501/97 |
| 4,746,636 | 5/1988 | Yokoyama | 501/97 |
| 4,764,490 | 8/1988 | Yamakawa et al. | 501/97 |
| 4,795,724 | 1/1989 | Soma et al. | 501/98 |

FOREIGN PATENT DOCUMENTS 48-7486 3/1973 Japan .
49-21091 5/1974 Japan .
63-100067 5/1988 Japan .

Primary Examiner—Mark L. Bell
Assistant Examiner—Deborah Jones
Attorney, Agent, or Firm—Parkhurst, Wendel & Rossi

[57] ABSTRACT

Silicon nitride sintered bodies are disclosed which contain silicon carbide therein and in which intergranular phases between silicon nitride particles are substantially crystallized. Further, a manufacturing method of the sintered bodies is disclosed, in which a silicon carbide powdery raw material is used as an additive when preparing raw powders and the intergranular phases are crystallized during a temperature descending stage following a firing. Silicone carbide effectivley promotes densification of the structure of the sintered body and crystallization of the intergranular phases, thereby making it possible to provide the sintered bodies having intergranular phases with little glass phases uncrystallized and excellent high-temperature strengths.

5 Claims, 1 Drawing Sheet

FIG_1
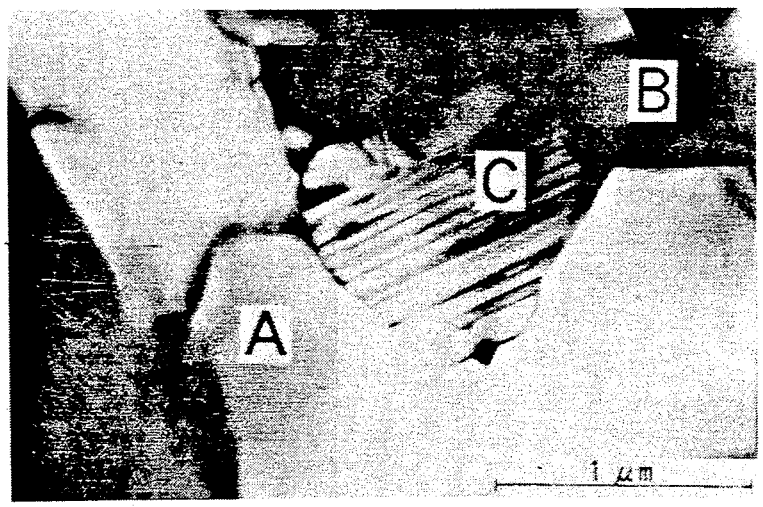
A: $\beta$-$Si_3N_4$
B: Intergranular Phase
C: SiC

METHOD OF MANUFACTURING SILICON NITRIDE SINTERED BODIES This is a continuation application of U.S. Ser. No. 07/521,567 filed May 10, 1990, now U.S. Pat. No 5,177,038 .

BACKGROUND OF THE INVENTION

1. Field of the Invention

The present invention relates to silicon nitride sintered bodies having excellent mechanical strengths at high temperature, and to a method of manufacturing the same.

2. Related Art Statement

Until recently, as for silicon nitride sintered bodies containing oxides of a group elements including rare earth elements as additives, for example, in Japanese Patent Publication No. 48-7486, a manufacturing method of the sintered body is disclosed which comprises preparing a mixed powder consisting essentially of at least 85 mol % of silicon nitride powdery raw material and less than 15 mol % of at least one oxide selected from the oxides of III a group elements, shaping the thus prepared powder, and subjecting the resulting shaped-body to a firing under an inert atmosphere. In Japanese Patent Publication No. 49-21091, the silicon nitride sintered body is also disclosed which consists of at least 50 wt % of $Si_3N_4$, less than 50 wt % of at least one oxide selected from $Y_2O_3$ oxides of La group elements, and 0.01~20 wt % of $Al_2O_3$.

However, it is unlikely to obtain a sintered body having excellent high-temperature strength when adding only rare earth elements to the silicon nitride powdery raw material. On the other hand, when the sintered body contains $Al_2O_3$ as an additive, structure of the sintered body is progressively densified, however, the softening point of its intergranular phase is lowered to considerably degrade the high-temperature strengths of the sintered body.

To obtain a sintered body having excellent high-temperature strength, the applicant of the present invention, in Japanese Patent Publication No. 63-100067, discloses a technique which provides the sintered body with excellent high-temperature strength by adding rare earth elements, having a predetermined composition and a predetermined weight ratio, to the silicon nitride powdery raw material and by specifying the crystal phase of the sintered body.

In the silicon nitride sintered body disclosed in the Japanese Patent Publication No. 63-100067, it is possible to improve the high-temperature strength of the sintered body to a certain extent, which is still lower than a room-temperature strength thereof. The result is interpreted as follows. Even performing crystallization of grain boundaries of the sintered body still leaves some amount of uncrystallized glass phase when adopting the composition disclosed in the publication. For lowering a residual amount of the uncrystallized glass phase, it is possible to propose a manufacturing method comprising a powdery raw material in which little glass phase remains in the grain boundaries by enlarging a molecule ratio of the added oxides of the rare earth elements with respect to an amount of $SiO_2$, to which a whole amount of oxygen contained in the silicon nitride powdery raw material is converted. However, the method makes it difficult to sufficiently densify the structure of the sintered body.

SUMMARY OF THE INVENTION

It is an object of the present invention to eliminate the drawbacks mentioned above, and to provide silicon nitride sintered bodies having substantially same excellent strength at high temperatures as that at room temperatures, and a method of manufacturing the same.

The present invention provides silicon nitride sintered bodies, which consist essentially of silicon nitride, at least one compound of a rare earth element and silicon carbide, and in which intergranular phases between silicon nitride particles contained in the sintered bodies are substantially composed of crystal phases.

Further, the present invention provides a method of manufacturing silicon nitride sintered bodies which comprises:

preparing a powder consisting of powdery raw materials of silicon nitride, at least one oxide of a rare earth. element and silicon carbide, shaping the thus prepared powder to obtain a shaped-body, subsequently subjecting the shaped-body to a firing under an $N_2$ atmosphere, and substantially crystallizing intergranular phases between silicon nitride particles during a temperature descending stage following the firing.

In the above mentioned construction, the following effects are found: Namely, the present invention, which comprises adding a silicon carbide powder to the silicon nitride powdery raw material containing the oxides of selected rare earth elements shaping the resulting powder and firing the thus obtained shaped body under the $N_2$ atmosphere to crystallize the shaped-body, makes it possible to provide the sintered body containing silicon carbide with intergranular phases between silicon nitride particles substantially forming crystal phases and to substantially eliminate residual glass phases in grain boundaries in the silicon nitride sintered body. Thereby it becomes possible to provide the sintered body with excellent high-temperature strength substantially equal to the room temperature strength thereof.

Namely, if an amount of the oxides of rare earth elements added to the silicon nitride powdery raw material, which contains the silicon carbide powder as an additive and a certain amount of oxygen, is larger than a predetermined amount of the oxides thereof, which provides the resulting sintered body with the most excellent high-temperature strength when the powdery raw material contains no silicon carbide powder and the above certain amount of oxygen, it is possible to sufficiently densify the structure of the sintered body by adding the silicon carbide powder, which also results in effective crystallization of the grain boundaries. Consequently, it is possible to obtain the silicon nitride sintered body, having the crystallized intergranular phase with very little glass phase and excellent high-temperature strength. Further, the certain amount of oxygen contained in the silicon nitride powdery raw material is indicated in its converted $SiO_2$ amount. Moreover, the above predetermined amount of the oxides of rare earth elements, which provides the sintered body with the most excellent high-temperature strength when no silicon carbide powder is added, differs according to the silicon nitride powdery raw material used. If the amount of the oxides of rare earth elements added to the powdery raw material is not larger than the predetermined amount of the oxides thereof, it is possible to proceed with the densification of the structure of the sintered body without adding the silicon carbide powder. However, it becomes possible to promote crystallization of grain boundaries, and consequently to obtain the silicon nitride sintered body having intergranular phases with little glass phases and the excellent high-temperature strength, by adding the silicon carbide powder.

An amount of oxygen in the silicon nitride powdery raw material is preferably 1~3 wt %. The amount of oxygen can be controlled by oxidizing the silicon nitride powdery raw material, or by adding a silicon oxide powder thereto.

A total amount of oxides of rare earth elements as additives is preferably 2.7~10 mol %. The reason is as follows: If the total amount is lower than 2.7 mol %, it is impossible to obtain a liquid phase to sufficiently cause the densification. If the total amount is higher than 10 mol %, it exhibits a tendency to make the densification difficult even when adding the silicon carbide powder. Further, it is possible to use $Lu_2O_3$, $Tm_2O_3$, $Er_2O_3$, etc. as the oxides of rare earth elements other than $Y_2O_3$, $Yb_2O_3$ to obtain substantially the same effects. An amount of rare earth elements contained in the resulting sintered body is the same as that of the elements contained in the starting powdery raw material. The amount of the oxides of rare earth elements (indicated by mol %) is calculated as (the amount of the oxides of rare earth elements indicated by mol)/(a sum of the amount of the oxides of rare earth elements and silicon nitride, both indicated by mol).

The amount of the silicon carbide powder as an additive is preferably 0.1~11 wt % with respect to an amount of a formulated powder consisting of silicon nitride and the oxides of rare earth elements. When the amount of the silicon carbide powder is smaller than 0.1 wt %, it is impossible to sufficiently densify the structure of the sintered body and effectively the crystallization. On promote other hand when the amount is larger than 11 wt %, silicon carbide may occasionally inhibit the densification. The amount of the silicon carbide powder is more preferably 0.5~7 wt %. The amount of silicon carbide contained in the sintered body may be reduced a little compared to the amount of the silicon carbide powder formulated into the raw material. Moreover, $\alpha$-type, $\beta$-type and amorphous silicon carbide may be used as appropriate, respectively.

In the method of manufacturing silicon nitride sintered bodies according to the invention, first the formulated powdery raw material is prepared by mixing the silicon nitride powder, the powder of the oxide of each rare earth element and the silicon carbide powder. Next, the thus prepared mixture is shaped to a predetermined shape to produce the shaped-body. Subsequently, the resulting shaped-body is subjected to firing at a temperature of 1700°~2100° C., preferably 1900°~2000° C., under $N_2$ atmosphere at a normal pressure or a high pressure according to the firing temperature, and the intergranular phases are substantially crystallized during the following temperature-descending step. Consequently, the silicon nitride sintered body according to the invention is obtained having the intergranular phases between silicon nitride particles, which is substantially crystallized and contains very little glass phase.

BRIEF DESCRIPTION OF THE DRAWINGS

FIG. 1 is a photograph showing microstructures of the sintered body according to the invention.

DESCRIPTION OF THE PREFERRED EMBODIMENTS

Hereinafter, actual embodiments according to the invention will be described.

A silicon nitride powder having a purity of 97 weight %, an oxygen content of 2.2 weight %, an average grain diameter of 0.6 μm and BET specific surface area of 17 m²/g, additives described in Table 1, each additive having a purity of 99.9 weight %, an average grain diameter of 0.3~2.5 μm, and a silicon carbide powder having a purity of 99 weight %, an average grain diameter of 0.4 μm and BET specific surface area of 20 m²/g are mixed and formulated in the proportions as described in Table 1. Then, by using media made of silicon nitride porcelain and a nylon resin vessel having an inner volume of 1.2 l, 1.8 kg of media and 300 ml of water were added to 200 g of the formulation raw material, which was ground by a vibration mill at a vibration rate of 1200 times/min for 3 hours. Subsequently, the water was evaporated to obtain dry powders, which were further granulated to have a grain diameter of 150 μm. The thus obtained powders were isostatic-pressed under a pressure of 7 ton/cm² to obtain shaped bodies having dimensions of 50×40×6 mm, which were then fired according to the firing conditions as described in Table 1 to provide silicon nitride sintered bodies Nos. 1~27 according to the invention. Besides, by using the same silicon nitride raw materials as described above, formulated powdery raw materials were obtained by adopting additives and formulated ratios as described in Table 1. Then, the resulting formulated powdery raw materials were ground, granulated and shaped as described above, and the resulting shaped bodies were then subjected to firing in the firing conditions as described in Table 1 to obtain the sintered bodies according to comparative embodiment Nos. 28~31. Besides, in the comparative example Nos. 29 and 30, the crystallization was performed by a reheating treatment.

Bulk densities, four point bending strengths at room temperature and 1400° C. of the sintered body were measured and the intergranular crystal phases thereof were detected. The experimental results were shown in Table 1, in which the bulk densities of the sintered bodies were measured by Archimedes method and indicated as values relative to theoretical densities calculated from the compositions and densities of the formulated powders. The densities of the formulated powders were calculated by adopting the following values; $Si_3N_4$: 3.2 g/cm³, $Y_2O_3$: 5.0 g/cm³, $Yb_2O_3$: 9.2 g/cm³, $Tm_2O_3$: 8.8 g/cm³, $Lu_2O_3$: 9.4 g/cm³, $Er_2O_3$: 8.6 g/cm³, SiC: 3.2 g/cm³. The four point bending strengths were measured according to "a testing method of bending strengths of fine ceramic materials (JIS R-1601)". The intergranular crystal phases were detected by performing X-ray diffraction test using CuKα-ray. In Table 1, J is used to mean a crystal phase having a caspidine structure, which have the same type diffraction curve as that of $Si_3N_4.4Y_2O_3$. $SiO_2$ shown in JCPDS card No. 32-1451 and in which the crystallographic position of Y can be replaced or occupied by the other rare earth elements. H is used to mean a crystal phase having an apatite structure, which have the same type diffraction curve as that of $Si_3N_4.10Y_2O_3.9SiO_2$ shown in JCPDS card No. 30-1462 and in which the crystallographic position of Y can be replaced or occupied by the other rare earth elements. K is used to mean a crystal phase having an wollastonite structure, which have the same type diffraction curve as that of $2Y_2O_3 \cdot SiO_2 \cdot Si_3N_4$ shown in JCPDS card No. 31-1462 and in which the crystallographic position of Y can be replaced or occupied by the other rare earth elements. L is used to mean a crystal phase indicated as $Re_2SiO_5$ (Re: rare earth elements), which have the same type diffraction curve as that shown in JCPDS card No. 21-1456, 21-1458, 21-1461, 22-992 or 36-1476. S is used to mean a crystal phase indicated as $Re_2Si_2O_7$ (Re: rare earth elements), which have the same type diffraction curve as that shown in JCPDS Card 20-1416, 21-1457, 21-1459, 21-1460, 22-994 or 22-1103.

Moreover, in Table 1, ratios of intergranular crystal phases were also shown, and they were detected by an integrated value of the strength peak of respective intergranular phases other than $\beta$-$Si_3N_4$.

Further, in FIG. 1, a SEM photograph of the sintered body No. 4 according to the invention was shown. In FIG. 1, A shows $\beta$-$Si_3N_4$ particles, B shows intergranular phases and C shows SiC particles.

silicon carbide as an additive was not sufficiently densified. The results demonstrate that the silicon carbide additive promotes densification of the structure effectively.

For example, sample Nos. 8, 12 according to the invention, in which the amounts of the oxides of rare earth elements as additives were relatively low and the grain boundaries were crystallized to principally form H phases by adding silicon carbide, had higher strengths at the high temperature compared to that of the comparative sample Nos. 29, 30, in which no silicon carbide was added and the grain boundaries were crystallized by performing the reheating treatment. In this case, silicon carbide as an additive effectively promote crystallization of the grain boundaries to effectively reduce the residual glass phase therein rather than the densification of the structure of the sintered body.

As can be seen from the above explanation, in the silicon nitride sintered body and the manufacturing method thereof according to the present invention,

TABLE 1

| No. | Oxides of rate earth elements (wt %) $Y_2O_3$ | $Yb_2O_3$ | The other | Total amount of the oxides (mol %) | SiC (wt %) | Temperature (°C.) | Time (hr) | Pressure (atm) | Relative density (%) | Room-temperature strength (MPa) | Strength at 1400° C. (MPa) | Intergranular crystal phase |
|---|---|---|---|---|---|---|---|---|---|---|---|---|
| Present invention | | | | | | | | | | | | |
| 1 | 3.4 | 14 | | 7.8 | 0.1 | 1900 | 2 | 10 | 97 | 770 | 750 | J:H = 50:50 |
| 2 | 3.4 | 14 | | 7.8 | 0.5 | 1900 | 2 | 10 | 99 | 800 | 800 | J:H = 60:40 |
| 3 | 3.4 | 14 | | 7.8 | 1 | 1900 | 2 | 10 | 99 | 810 | 810 | J:H = 70:30 |
| 4 | 3.4 | 14 | | 7.8 | 5 | 1900 | 2 | 10 | 99 | 810 | 810 | J = 100 |
| 5 | 3.4 | 14 | | 7.8 | 7 | 1900 | 2 | 10 | 98 | 800 | 800 | J = 100 |
| 6 | 3.4 | 14 | | 7.8 | 11 | 1900 | 2 | 10 | 97 | 770 | 760 | J = 100 |
| 7 | 2 | 9 | | 4.7 | 0.5 | 1900 | 2 | 10 | 99 | 780 | 770 | H = 100 |
| 8 | 2 | 9 | | 4.7 | 1 | 1900 | 2 | 10 | 99 | 790 | 780 | H = 100 |
| 9 | 2 | 9 | | 4.7 | 3 | 1900 | 2 | 10 | 99 | 790 | 790 | H:J = 60:40 |
| 10 | 2 | 9 | | 4.7 | 7 | 1900 | 2 | 10 | 98 | 780 | 780 | J:H = 60:40 |
| 11 | 2 | 9 | | 4.7 | 1 | 2100 | 2 | 100 | 99 | 780 | 750 | J:H:K = 50:40:10 |
| 12 | 2 | 7 | | 3.9 | 1 | 1900 | 2 | 10 | 98 | 730 | 700 | H:S = 70:30 |
| 13 | 2 | 7 | | 3.9 | 3 | 1900 | 2 | 10 | 98 | 710 | 700 | H = 100 |
| 14 | 2 | 4 | | 2.7 | 1 | 1900 | 2 | 10 | 97 | 680 | 670 | L:S = 70:30 |
| 15 | 0 | 15 | | 5.9 | 3 | 1700 | 3 | 1 | 97 | 780 | 770 | J = 100 |
| 16 | 10 | 0 | | 6.4 | 1 | 1950 | 2 | 50 | 98 | 800 | 800 | J:H = 80:20 |
| 17 | 4.2 | 17 | | 10 | 2 | 1900 | 2 | 10 | 97 | 760 | 760 | J = 100 |
| 18 | 3.8 | 15 | | 8.8 | 2 | 1900 | 2 | 10 | 98 | 800 | 800 | J = 100 |
| 19 | 2.6 | 11 | | 5.8 | 1 | 1900 | 2 | 10 | 98 | 800 | 790 | J:H = 60:40 |
| 20 | 0 | 19 | | 7.8 | 1 | 1900 | 2 | 10 | 99 | 810 | 800 | J = 100 |
| 21 | 5.8 | 10 | | 7.8 | 1 | 1900 | 2 | 10 | 98 | 800 | 790 | J = 100 |
| 22 | 3.4 | 14 | | 7.8 | 1 | 2000 | 2 | 100 | 99 | 810 | 800 | J = 100 |
| 23 | 3.4 | 14 | | 7.8 | 1 | 1950 | 2 | 15 | 99 | 810 | 810 | J = 100 |
| 24 | 3.4 | 14 | | 7.8 | 1 | 1800 | 3 | 10 | 97 | 770 | 760 | J:H = 80:20 |
| 25 | 2 | 0 | $Tm_2O_3$ 9 | 4.7 | 7 | 1950 | 2 | 20 | 98 | 760 | 760 | H:L = 60:40 |
| 26 | 0 | 7 | $Lu_2O_3$ 7 | 4.6 | 3 | 1900 | 2 | 10 | 98 | 780 | 780 | J = 100 |
| 27 | 2 | 0 | $Er_2O_3$ 13 | 6.6 | 1 | 1900 | 2 | 10 | 99 | 800 | 800 | J = 100 |
| Comparative examples | | | | | | | | | | | | |
| 28 | 3.4 | 14 | | 7.8 | 0 | 1900 | 6 | 10 | 90 | 400 | 300 | J:H:L = 40:40:20** |
| 29 | 2 | 9 | | 4.7 | 0 | 1900 | 2 | 10 | 98 | 700 | 650 | H:S = 70:30* |
| 30 | 2 | 7 | | 3.9 | 0 | 1900 | 2 | 10 | 98 | 730 | 620 | H:S = 60:40* |
| 31 | 4.2 | 17 | | 10 | 0 | 1900 | 6 | 10 | 80 | — | — | J = 100** |

(Note)
*Intergranular phases were crystallized by performing the reheating treatment.
**not sufficiently densified
J: Caspidine structure
K: Wollastonite structure
S: $Re_2Si_2O_7$ (Re: rare earth elements)
H: Apatite structure
L: $Re_2SiO_5$ (Re: rare earth elements)

As clearly shown in Table 1, the sample Nos. 1~6 according to the invention, which contain relatively large amount of the oxides of rare earth elements and further silicon carbide as additives, had high relative densities of more than 97% and high strengths at high temperature, which was only a little different from the room-temperature strengths. On the contrary the, structure of the comparative sample No. 28 containing no because silicon carbide is added to the silicon nitride powder containing predetermined oxides of each rare earth element and the thus obtained formulated powdery raw material is shaped to form the shaped body which is then subjected to the firing under the $N_2$ atmosphere and crystallized, it is possible to provide the sintered body containing silicon carbide, in which the intergranular phases between silicon nitride particles are substantially crystallized and the high-temperature strength of the sintered body is comparable to the room-temperature strength thereof.

What is claimed is:

1. A method of manufacturing a silicon nitride sintered body, comprising the steps of:
    preparing a powder consisting essentially of
       a) silicon nitride;
       b) 2.7-10mol % of an oxide of Yb or mixtures of oxides of Yb and one or more other rare earth elements; and
       c) silicon carbide in an amount of 0.1-11wt % relative to an amount of said silicon nitride and said oxides of rare earth elements;
    shaping the powder to obtain a shaped body;
    firing the shaped body at a temperature of 1700°-2100° C. under an $N_2$ atmosphere; and
    substantially crystallizing intergranular phases between silicon nitrite particles by cooling the fired body.

2. The method of claim 1, wherein said other rare earth elements are selected from the group consisting of Y, Lu, Tm and Er.

3. The method of claim 1, wherein said other rare earth elements is Y.

4. The method of claim 1, wherein said firing is performed for at least 2 hours.

5. The method of claim 4, wherein said firing is performed under a pressure of at least 10 atm.

* * * * *